United States Patent [19]

Hirai et al.

[11] Patent Number: 6,061,701

[45] Date of Patent: May 9, 2000

[54] HYPERTEXT DOCUMENT PROCESSING APPARATUS WITH DISPLAY MEANS DISPLAYING INPUT DATA AND ADDITIONAL DISPLAY MEANS DISPLAYING TRANSLATED DATA

[75] Inventors: Tokuyuki Hirai; Naoko Shinozaki, both of Nara; Kazuo Nishiura, Yamatokoriyama, all of Japan

[73] Assignee: Sharp Kabushiki Kaisha, Osaka, Japan

[21] Appl. No.: 08/821,796

[22] Filed: Mar. 21, 1997

[30] Foreign Application Priority Data

Mar. 22, 1996 [JP] Japan .................................. 8-065830

[51] Int. Cl.[7] ................................................. G06F 17/21
[52] U.S. Cl. ........................................ 707/536; 707/513
[58] Field of Search .................................. 704/4, 5, 2, 7, 704/6, 3, 9; 707/536, 5, 115

[56] References Cited

U.S. PATENT DOCUMENTS

| | | | |
|---|---|---|---|
| 4,567,573 | 1/1986 | Hashimoto et al. | 704/10 |
| 5,091,876 | 2/1992 | Kumano et al. | 704/3 |
| 5,345,551 | 9/1994 | Shelley et al. | 345/346 |
| 5,349,368 | 9/1994 | Takeda et al. | 345/115 |
| 5,659,765 | 8/1997 | Nii | 704/4 |
| 5,768,603 | 6/1998 | Brown et al. | 704/9 |
| 5,854,997 | 12/1998 | Sukeda et al. | 704/3 |

FOREIGN PATENT DOCUMENTS

| | | |
|---|---|---|
| 4-247572 | 9/1992 | Japan . |
| 6-44296 | 2/1994 | Japan . |

OTHER PUBLICATIONS

Tribute, Andrew, Iota's Newsware. "The Seybold Report on Publishing Systems." No. 11, vol. 24, p. 3 (Feb. 13, 1995) pp. 1–41 at 25.

*Primary Examiner*—James P. Trammell
*Assistant Examiner*—John Leonard Young

[57] ABSTRACT

The data processor according to the present invention includes a memory for storing data including at least a first document and a second document having a link to the first document, a first display for displaying the data stored in the memory, a translator for translating the data displayed on the first display, a second display for displaying translation by the translator, an indicator for indicating a specific portion of the first document displayed on the first display or a specific portion of the translation thereof displayed on the second display and display controller for controlling so that the second document linked to the specific portion indicated by the indicator is displayed on the first display.

10 Claims, 7 Drawing Sheets

FIG.2A

場所:http://www.abcde.co.jp/

Welcome to
ABCDE Corporation

- Introduction
- Products
- Support

場所:file:///c:/window/temp/

ABCDE株式会社へ
ようこそ

場所:http://www.abcde.co.jp/s

Products

- WORD-PROCESSOR
- PERSONAL-COMPUTER
- CALCULATOR

場所:file:///c:/window/temp/

ABCDE株式会社へ
ようこそ

| 5 |
|---|

FIG.7

| "http://www.abcde.co.jp/" |
|---|

FIG.8

| INPUT/OUTPUT SECTION FOR ORIGINAL TEXT | INPUT/OUTPUT SECTION FOR TRANSLATED TEXT |
|---|---|
| 5 | 6 |
| 7 | 8 |
| 9 | 10 |

HYPERTEXT DOCUMENT PROCESSING APPARATUS WITH DISPLAY MEANS DISPLAYING INPUT DATA AND ADDITIONAL DISPLAY MEANS DISPLAYING TRANSLATED DATA

BACKGROUND OF THE INVENTION

1. Field of the Invention

The present invention relates to a data processor for translating texts provided with linkage data referred to as hypertexts.

2. Description of Related Art

Conventionally, as shown in FIG. 9(A), for the translation of hypertexts, input/output sections (windows) are provided separately for original text and for translated text. Original texts are displayed on the input/output section 5 for original text and translated texts are displayed on the input/output section 6 for translated text.

As shown in FIG. 9(A), when a linkage indication is given with respect to an item, for example, "product," on the input/output section 6 for translated text, the original text linked to the item is displayed on the input/output section 6 for translated text, but the input/output section 5 for original text remains unchanged.

In other words, when another document in hypertext is called up by indicating a portion linked to the document or by indicating the document specifically, the document is displayed on an input/output section where a user operates the indication, even though the user operates the indication on the input/output section for translated text.

In the above-mentioned prior art, when a linked document to be called up is indicated in the input/output section for translated text, the linked document is displayed in an original language (e.g., in English) on the input/output section for translated text, where translated text (e.g., in Japanese) has been displayed so far, because the linkage data is generally provided to the original text.

Therefore, when a user wants to go on to linked information from translated text, e.g., in Japanese, but finds that the linked information is displayed in original language, e.g., in English, the user is inconvenienced.

In some applications for displaying hypertexts, information can be traced back from a displayed document by referring to the precedingly displayed document, to the document displayed before the preceding document, and so on. In applications having such a historical reference function, a problem arises that both the original and translated documents are overlap when displayed on the same section during the tracing.

SUMMARY OF THE INVENTION

Therefore, an object of the present invention is to display linked documents in an original text on a input/output section for original text, and another object is to achieve easier grasp of a linkage of documents in tracing a reference record.

In order to achieve the above-described objects, the present invention provides a data processor comprising a memory for storing data including at least a first document and a second document having a link to the first document, a first display for displaying the data stored in the memory, a translator for translating the data displayed on the first display means, a second display means for displaying a translation by the translator, an indicator means for indicating a specific portion of the first document displayed on the first display means or a specific portion of the translation thereof displayed on the second display means, and a display controller for controlling the displays so that the second document linked to the specific portion indicated by the indication means is displayed on the first display.

BRIEF DESCRIPTION OF THE DRAWINGS

FIGS. 2A and 2B illustrate examples of display on input/output sections of the data processor in accordance with the present invention;

FIG. 6 illustrates an exemplary buffer for the number of an input/output section;

FIG. 7 illustrates an exemplary buffer for URL data;

FIG. 8 illustrates an exemplary correspondence table; and

DESCRIPTION OF THE PREFERRED EMBODIMENTS

The data processor of the invention preferably comprises plural pairs of a first display means and a second display means.

The data processor of the invention preferably comprises a correspondence table to correspond one of the plural first display means to one of the plural second display means.

Preferably, before the second document linked to the specific portion indicated by the indication means is displayed, the display control means judges which specific portion is displayed, on one of the plural first display means or on one of the plural second display means, by referring to the correspondence table. When the specific portion is displayed on one of the plural first display, the display control means displays the second document on said one of the plural first display means. When the specific portion is displayed on one of the plural second display means, the display control means determines the one of the plural first display means corresponding to said one of the plural second display means by referring to the correspondence table and displays the second document on said one of the plural first display means.

In the present invention, the plural pairs of first display means and second display means may include windows displayed on a single screen which are capable of displaying data individually for each pair.

Also, in the present invention, the data including the first document and the second document may be a hypertext. The first display means may comprise a window for displaying and indicating the original text of the hypertext. The second display means may comprise a window for displaying and indicating the translation of the original text.

The present invention will hereinafter be described in detail by way of embodiment thereof, which is not intended to limit the scope of the present invention, as shown in the attached drawings.

The data processor of the present invention will be described in detail by taking, for example, a data processor provided with a display section using the WWW browser for displaying a hypertext.

Figure 1:
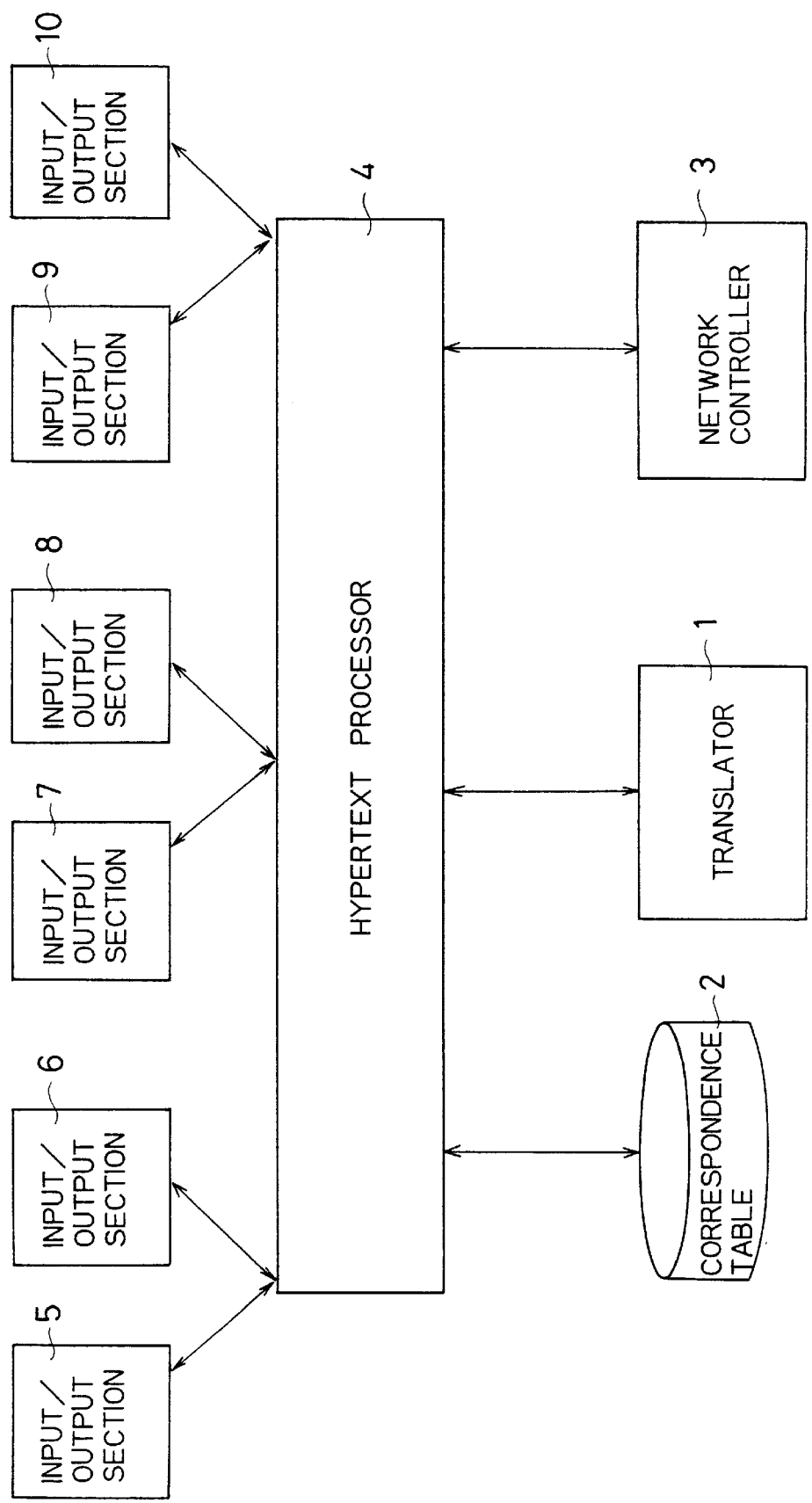
FIG. 1 is a block diagram illustrating a data processor in accordance with the present invention.

Referring to the block diagram shown in FIG. 1 which illustrates an exemplary data processor of the present invention, a translator 1 serves to translate a hypertext, a correspondence table 2 serves to relate input/output sections (windows) 5, 7, 9 for displaying original text to input/output sections (windows) 6, 8, 10 for displaying translated text, respectively, a network controller 3 serves to input data from a network, a hypertext processor 4 serves to control input/output of the hypertext, the input/output sections 5, 7, 9 serve to display the original text of the hypertext and receive input by a user, and the input/output sections 6, 8, 10 serve to display the translation of the original text and receive input by the user.

FIG. 2(A) illustrates an example of display on the input/output sections 5, 6 before a link indication, and FIG. 2(B) illustrates an example of display on the input/output sections 5, 6 after the link indication. Referring to FIG. 2(B), an original text is displayed on the input/output section 5 and the translation thereof is displayed on the input/output section 6. In this state, when an item "SEIHIN (product)" on the input/output section 6 is indicated for retrieving a linked document, the corresponding linked document is displayed in the form of original text on the input/output section 5, but the display on the input/output section 6 remains unchanged.

Figure 3:
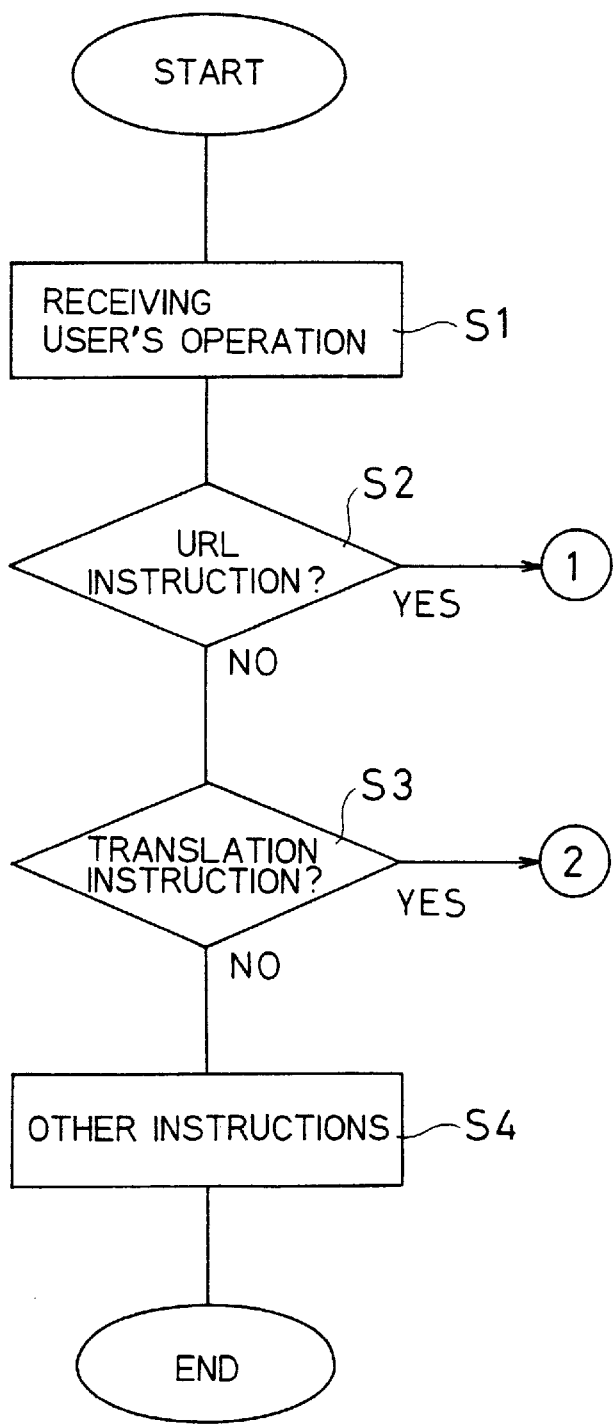
FIG. 3 is a flowchart explaining a process by the data processor in accordance with the present invention.

This process will be explained in detail with reference to the flowcharts shown in FIGS. 3 to 5.

For explanation, when the original and the translation of the hypertext are displayed on the different input/output sections as shown in FIG. 2(A), a user gives a new URL (Uniform Resource Locator) instruction with regard to the hypertext by specifying a URL location itself or by indicating a link, or gives a translation instruction.

First, the input/output section 5 or 6 receives the user's operation (Step S1). Then, the hypertext processor 4 judges whether or not the operation indicates a URL instruction (Step S2). If the operation indicates a URL instruction (YES), the process goes to process (1). If the operation does not indicate a URL instruction (NO), the process goes to Step S3. In Step S3, the hypertext processor 4 judges whether or not the operation indicates a translation instruction. If the operation indicates a translation instruction (YES), the process goes to process (2). If the operation does not indicate a translation instruction (NO), the process goes in accordance to the operation (Step 4) and then the process finishes.

Figure 4:
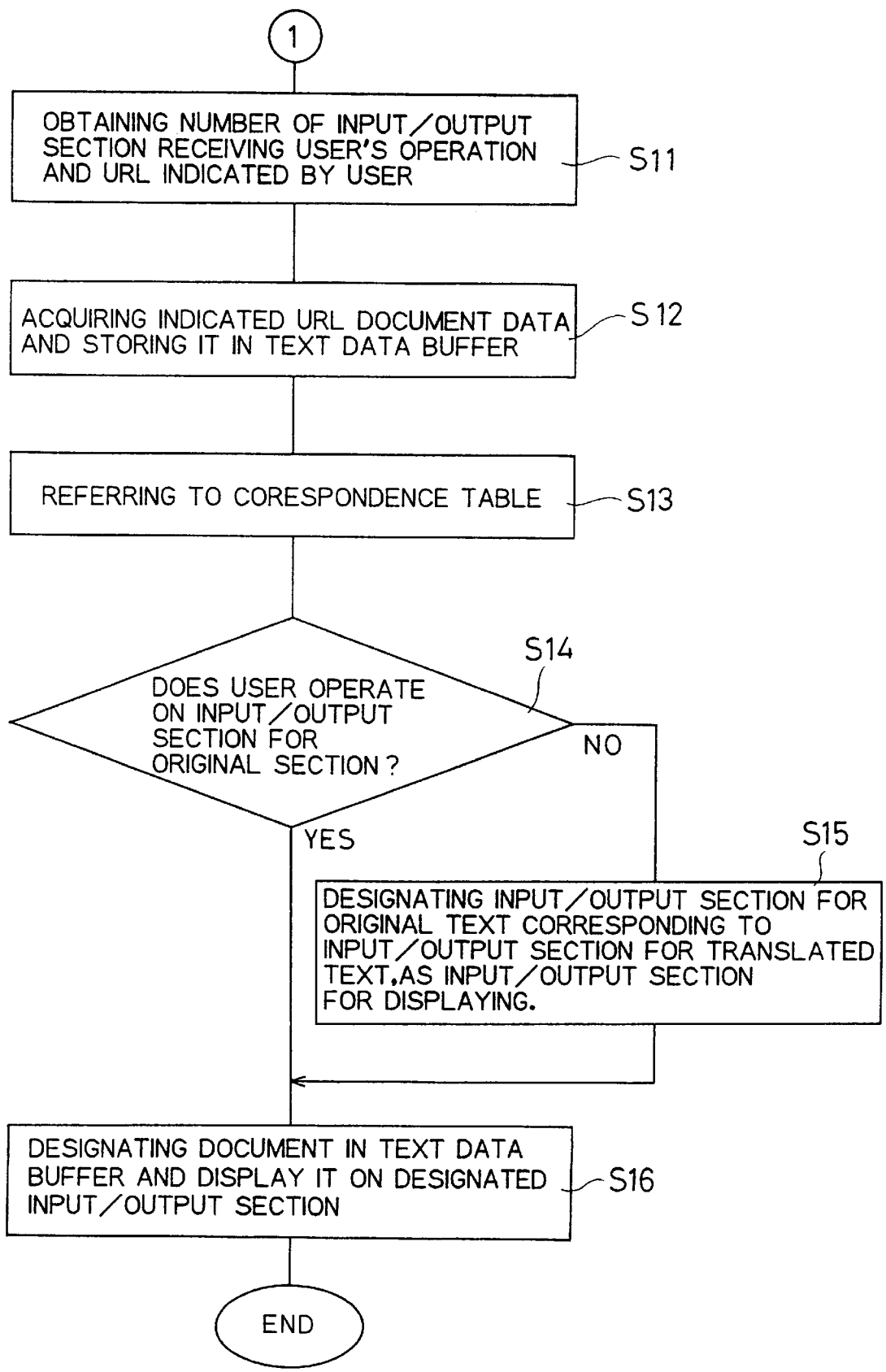
FIG. 4 is a flowchart explaining a process by the data processor when a URL instruction is given.

FIG. 4 is a flowchart explaining the process when the operation indicates a URL instruction, i.e., process (1).

When any of the input/output sections 5 to 10 receives a user's operation, the hypertext processor 4 stores the number of the input/output section receiving the operation in a buffer for storing the number of an input/output section (referred to as input/output section number buffer), and stores a URL letter sequence indicated by the user in a buffer for storing URL data (referred to as URL data buffer) (Step S11), both the buffers included in the hypertext processor 4.

In this embodiment, the input/output section number buffer stores numerals 5, 6, 7, 8, 9, and 10 for example, but the range of the numerals may vary depending on the number of input/output sections. Alternatively, the buffer may store letter sequences identifying input/output sections. FIG. 6 illustrates an example of the input/output section number buffer. FIG. 7 illustrates an example of the URL data buffer.

Next, the hypertext processor 4 acquires document data of the indicated URL from a network via the network controller, and stores the acquired document data in a buffer for storing text data (Step S12).

A correspondence table (shown in FIG. 8) is a table for corresponding the plural input/output sections (e.g., 5, 7 and 9) displaying original texts to the input/output sections (e.g., 6, 8 and 10) displaying the translations corresponding the original texts (e.g., the pairs of corresponding input/output sections being 5–6, 7–8, and 9–10).

The hypertext processor 4 refers to the correspondence table (Step S13) to judge, from the number of the input/output section stored in the input/output section number buffer, whether or not the user performs the operation on the input/output section for original text (Step S14). If the user does (YES), the process goes to Step S16. If the user does not (NO), that is, if the user performs the operation on the input/output section for translated text, the process goes to Step S15.

In Step S15, that is, when the user's operation is input on the input/output section for translated text, the hypertext processor 4 refers to the correspondence table shown in FIG. 8 to store, in the input/output section number buffer, the number of an input/output section for original text corresponding to the input/output section for translated text which receives the user's operation. In the example shown in FIG. 2, "6" is stored.

Then, the hypertext processor 4 displays the document in the text data buffer on the input/output section designated by the input/output section number buffer.

By the above-described process, the display shown in FIG. 2(B) is obtained.

Figure 5:
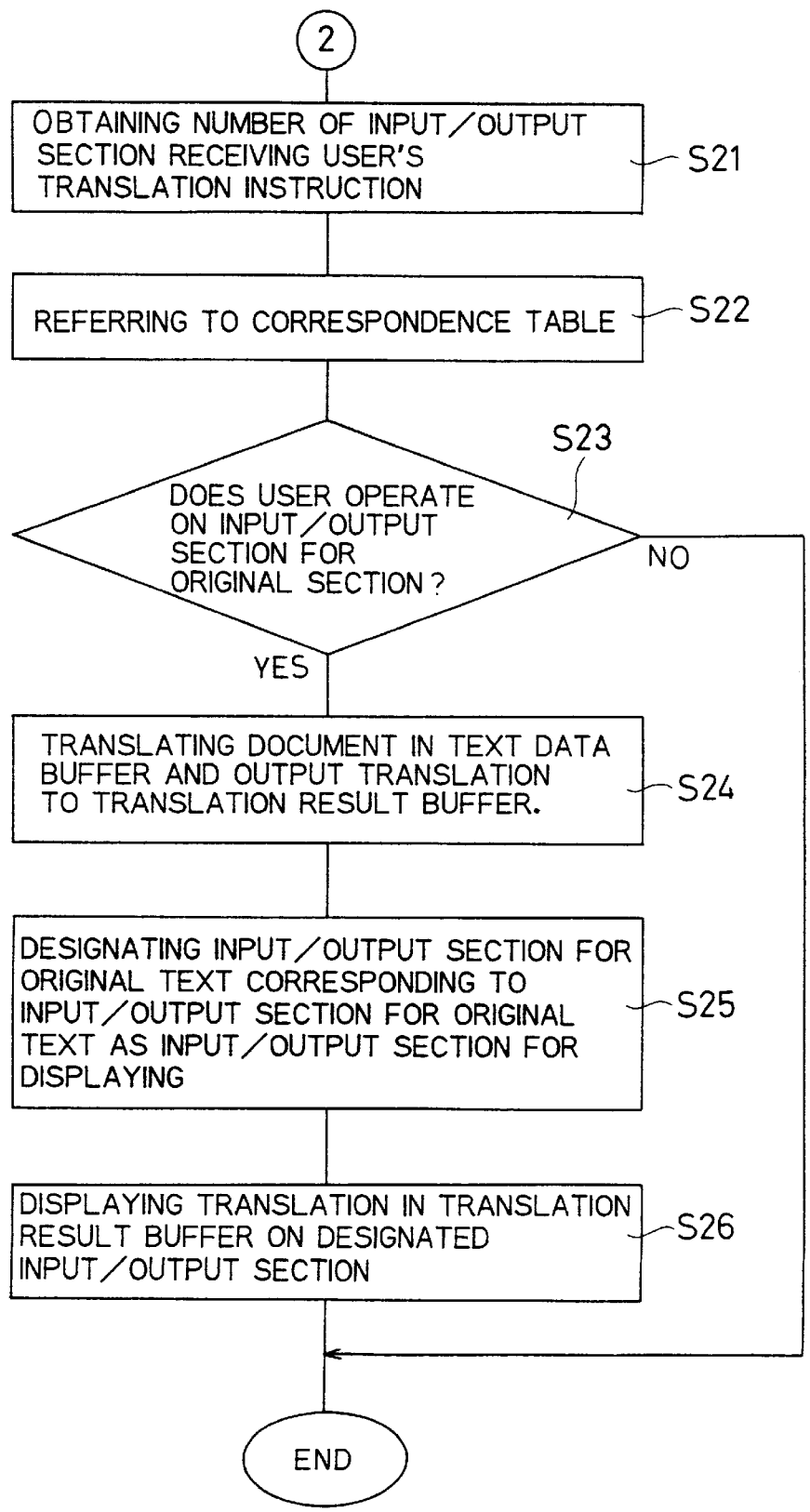
FIG. 5 is a flowchart explaining a process by the data processor when a translation instruction is given.
Figure 9A:
FIGS. 9A and 9B illustrate display on input/output sections of the conventional data processor.
Figure 9A:
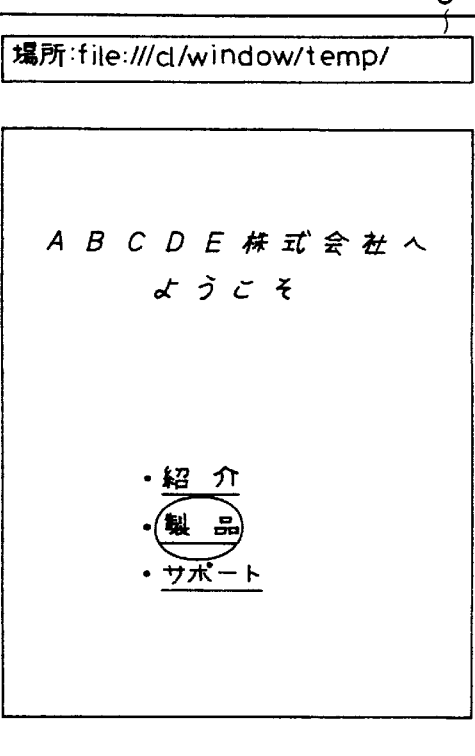
Figure 9B:
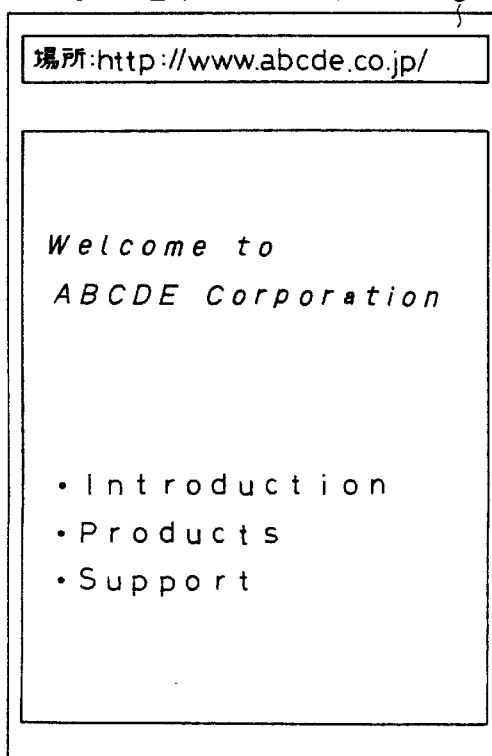
Figure 9B:
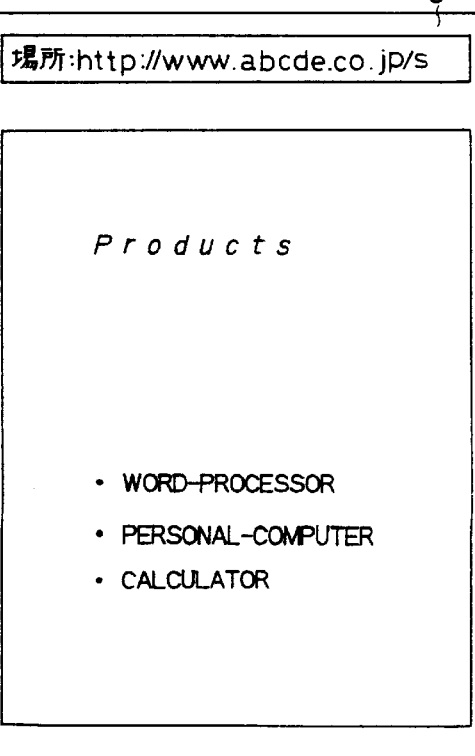

FIG. 5 is a flowchart explaining the process when the operation indicates a translation instruction, i.e., the process (2).

First, the hypertext processor 4 stores the number of the input/output section which receives the translation instruction, in the input/output section number buffer provided in the hypertext processor 4 (Step S21).

Then, the hypertext processor 4 refers to the correspondence table 2 (shown in FIG. 8) (Step S22) to judge, from the number of the input/output section stored in the input/output section number buffer, whether or not the user inputs the translation instruction on the input/output section for original text (Step S23). If the user does (YES), the process goes to Step S24. If the user does not (NO), that is, if the user inputs the translation instruction on the input/output section for translated text, the hypertext processor 4 judges that the translation is not necessary and ends the process.

In Step S24, the translator 1 translates the document in the text data buffer provided in the hypertext processor 4 and stores a translation result in a translation result buffer provided in the hypertext processor 4.

Then the hypertext processor 4 refers to the correspondence table 2 as shown in FIG. 8 to store, in the input/output section number buffer, the number of an input/output section for translated text corresponding to the input/output section for original text (Step S25).

The hypertext processor 4 then outputs the translation result stored in the translation result buffer on the input/output section designated by the input/output section number buffer (Step S26).

In short, according to the correspondence table as shown in FIG. 8, if a user gives a translation instruction 1) on the input/output section 5 and 7, the translation is performed and the result thereof is displayed in the input/output section 6 and 8, 2) on the input/output section 6, 8 and 10, the translation instruction is ignored, and 3) on the input/output section 9, the translation is performed and the result thereof is displayed in the input/output section 10.

Thus the present invention is able to be adopted for a plurality of pairs of original and translated documents.

In addition, though the correspondence between the input/output sections for original and translated text is all managed by the correspondence table in the above-described embodiment of the present invention, the input/output sections for original and translated text may be discriminated by directly rewriting tag data.

To sum up, the present invention provides a data processor comprising a memory for storing data including at least a first document and a second document having a link to the first document, first display means for displaying the data stored in the memory, a translator for translating the data displayed on the first display means, a second display means for displaying translation by the translator, indication means for indicating a specific portion of the first document displayed on the first display means or a specific portion of the translation thereof displayed on the second display means and display control means for controlling so that the second document linked to the specific portion indicated by the indication means is displayed on the first display means.

According to the present invention, whichever one of the specific portion of the first document displayed on the first display means and the specific portion of the translation of the first document displayed on the second display means may be indicated, the second document linked to the specific portion is always displayed on the first display means.

Thus, the first display means always displays an original document and the second display means always displays a translated document, and therefore it has become easier to grasp a reference record of documents when they are traced.

In another aspect, the present invention provides a processor further including a plurality of the first display means and the second display means. Thus, the processing of a text having a variety of linkage data such as hypertext can be performed.

What is claimed is:

1. A data processor comprising:

a memory for storing data including at least a first document, a hypertext and a second document having a link to the first document;

a first display for displaying the data stored in the memory, wherein said hypertext is displayed on a window of said first display;

a translator for translating the data displayed on the first display;

a second display for displaying a translation of the data displayed on the first display by the translator, wherein a translation of said hypertext is displayed on a window of said second display;

an indicator for indicating a specific portion of the first document displayed on the first display or a specific portion of the translation displayed on the second display; and a display control for having control so that the second document, which is linked to the specific portion indicated by the indicator, is displayed on the first display.

2. A data processor according to claim 1 further comprising a plurality of pairs of sais first and second displays.

3. A data processor according to claim 2, wherein the plural pairs windows displayed on a single screen which are capable of displaying data individually for each pair.

4. A data processor according to claim 2 further comprising a correspondence table for corresponding one of the plural first displays to one of the plural second displays.

5. A data processor according to claim 4, wherein when the second document linked to the specific portion indicated by the indication means is displayed, the display control determines on which display the specific portion is displayed, by referring to the correspondence table;

wherein when the specific portion is displayed on one of the plural first displays, the display control displays the second document on one of the plural first displays; and wherein when the specific portion is displayed on one of the plural second displays, the display control determines which one of the plural first displays corresponds to said one of the plural second displays by referring to the correspondence table, and displays the second document on said one of the plural first displays.

6. A method of translating data, comprising:

storing data including a first document, a hypertext and a second document linked to the first document;

displaying the stored data on a first display, wherein said hypertext is displayed on a window of said first display;

translating the data on the first display;

displaying the translated data on a second display distinct from said first display and adjacent to said first display, wherein a translation of said hypertext is displayed on a window of said second display;

indicating a specific portion of the first document on the first display, or a specific portion of the translated data on the second display; and controlling the first and second displays so that the second document, which is linked to the specific portion indicated, is displayed only on the first display, thereby providing a side-by-side comparison between an original and translated text to facilitate tracing and reference between the texts.

7. The method according to claim 6, wherein said first display is only one of a plurality of pairs of first displays, and wherein said second display is only one of a plurality of pairs of second displays.

8. The method according to claim 7, further comprising displaying data individually for each plural pair on adjacent windows within a single display screen.

9. The method according to claim 7, further comprising corresponding a plural pair of said first displays to a plural pair of said second displays with a correspondence table.

10. The method according to claim 9, wherein the step of indicating further includes:

determining which display the specific portion is displayed on;

displaying the second document on one of the plurality of first displays where the specific portion is determined to be on one of the plurality of first displays, and displaying the second document on one of the plurality of first displays where the specific portion is initially displayed. on one of the plurality of second displays, by referring to the correspondence table to determine which one of the plurality of first displays corresponds to second display that is displaying the specific portion.

* * * * *